United States Patent
Levene et al.

(10) Patent No.: US 9,488,738 B2
(45) Date of Patent: Nov. 8, 2016

(54) RADIATION DETECTOR COMPRISING A LIGHT REFLECTIVE MATERIAL

(75) Inventors: Simha Levene, Saad (IL); Naor Wainer, Israel (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1247 days.

(21) Appl. No.: 12/740,397

(22) PCT Filed: Oct. 29, 2008

(86) PCT No.: PCT/IB2008/054453
§ 371 (c)(1),
(2), (4) Date: Jul. 13, 2010

(87) PCT Pub. No.: WO2009/060340
PCT Pub. Date: May 14, 2009

(65) Prior Publication Data
US 2010/0296625 A1    Nov. 25, 2010

(30) Foreign Application Priority Data
Nov. 6, 2007    (CN) .......................... 2007 1 0185050

(51) Int. Cl.
*G01T 1/24*    (2006.01)
*G01T 1/20*    (2006.01)

(52) U.S. Cl.
CPC ........... *G01T 1/2018* (2013.01); *G01T 1/2002* (2013.01)

(58) Field of Classification Search
CPC .................................................. G01T 1/2002
See application file for complete search history.

(56) References Cited

U.S. PATENT DOCUMENTS

| | | | |
|---|---|---|---|
| 4,533,489 A | 8/1985 | Utts et al. | |
| 4,734,588 A | 3/1988 | Akai | |
| 5,059,800 A | 10/1991 | Ueman et al. | |
| 5,103,337 A * | 4/1992 | Schrenk et al. | 359/359 |
| 5,227,633 A | 7/1993 | Ryuo et al. | |
| 5,227,634 A | 7/1993 | Ryuo et al. | |

(Continued)

FOREIGN PATENT DOCUMENTS

| | | |
|---|---|---|
| EP | 1348982 A2 | 10/2003 |
| WO | 2006046163 A1 | 5/2006 |

OTHER PUBLICATIONS

Anonymous, "Polymers, Light and the Science of TiO2" Dupont technical literature H-88382-6 (Jun. 2007) downloaded Jan. 17, 2013 from <http://www2.dupont.com/Titanium_Technologies/en_US/tech_info/literature/Plastics/PL_B_Polymers_Light_Science.pdf>.*

*Primary Examiner* — David Porta
*Assistant Examiner* — Hugh H Maupin

(57) ABSTRACT

A light-reflecting material of a radiation detector, which also comprises photo-detecting elements and imaging elements adjacent to the photo-detecting elements, is provided. Typically, epoxy resin is used as the light-reflecting material. A tough, pliable resin may be used for the photo-detecting elements. This has the advantage of reducing thermal stresses inside the radiation detector, thus reducing the risk of delamination due to e.g. temperature shifts. Moreover, the tough, pliable resin preferably also has a low refractive index, which may increase the scattering co-efficient of the resin as compared to epoxy resin, which has a refractive index of 1.58. The layer thickness of a low-refractive index resin may thereby be reduced as compared to the layer thickness of epoxy resin for a given level of optical crosstalk. Preferable resins are silicon resins and resins of thermoplastic fluoropolymers.

26 Claims, 3 Drawing Sheets

(56) References Cited

U.S. PATENT DOCUMENTS

| | | | |
|---|---|---|---|
| 5,308,986 A * | 5/1994 | Walker | 250/370.11 |
| 5,548,116 A * | 8/1996 | Pandelisev | 250/256 |
| 6,452,186 B1 * | 9/2002 | Wieczorek et al. | 250/370.11 |
| 2003/0178570 A1 | 9/2003 | Tsunota et al. | |
| 2007/0045554 A1 | 3/2007 | Wakamatsu et al. | |

* cited by examiner

RADIATION DETECTOR COMPRISING A LIGHT REFLECTIVE MATERIAL

FIELD OF THE INVENTION

The present invention relates to a radiation detector and use of light-reflecting material in a radiation detector.

BACKGROUND OF THE INVENTION

Radiation detectors are particularly used in computed tomography (CT) scanners and will be described with particular reference thereto. However, the invention also finds use in DF (diffraction) and RF (radio frequency) imaging, X-ray fluoroscopy, radiography, and other examination systems for medical and non-medical examinations.

Computed tomography (CT) imaging typically employs an X-ray source that generates a beam of X-rays traversing an examination area. A subject arranged in the examination area interacts with and absorbs a portion of the traversing X-rays. A two-dimensional radiation detector including an array of detector elements is arranged opposite the X-ray source to detect and measure intensities of the transmitted X-rays.

Typically, the X-ray source and the radiation detector are mounted at opposite sides of a gantry which rotates so as to obtain an angular range of projection views of the subjects. In some configurations, the X-ray source is mounted on the rotating gantry, whereas the radiation detector is mounted on a stationary gantry. In either configuration, the projection views are reconstructed by using filtered back-projection or another reconstruction method to produce a three-dimensional image representation of the subject or of a selected portion thereof.

The radiation detector may include an imaging plate consisting of an array of imaging elements, such as scintillation crystals, which produce bursts of light, called scintillation events, in response to X-rays. Such radiation detectors may also include an array of photodetectors such as a photodiode array which is arranged to view the scintillation crystals and produce analog electric signals indicative of the spatial location and intensity of the scintillation events. Imaging plates, for use in CT scanners and general medical examinations, include an assembly of pixels being independently responsive to the incident X-rays and generating electric signals, which are used to generate a digital image. In some detectors, the scintillator assembly includes an array of individual crystals which are assembled together or cut from a common scintillator plate, e.g. by dicing or other semiconductor manufacturing techniques.

Most CT manufacturers today make X-ray detector arrays, wherein each detector comprises one or more scintillators and one or more photodiodes. The X-ray detectors comprise blocks of crystalline or ceramic X-ray scintillator material which emit light, separated from each other by white spacers or separators and being glued to the front surface of silicon photodiode arrays. The white separators or spacers, which are made of light-reflecting material, usually comprise an epoxy resin selected for radiation hardness, with a titanium dioxide filler to make it white. The function of the light-reflecting material is to reflect light, generated by scintillation when X-rays are absorbed in the body of the scintillator, downwardly into the sensitive region of the photo-detecting element, to avoid loss upwardly, or scattering sideways into neighbouring dixels (detector pixels).

The detector array may have many or even hundreds of detector pixels, or dixels, and is optically coupled to and juxtaposed upon a matching silicon photodiode array. The silicon photodiode array collects the light emitted by the scintillators and generates electric charges that are electronically processed and used to display voxel characteristics in the subsequent CT image.

However, problems exist in the known X-ray detector arrays. As the X-ray detector arrays grow in size, thermal expansion problems between the stiff epoxy resin having a high coefficient of thermal expansion (CTE) and the fragile silicon chip having a low CTE may cause delamination, especially when the assembly suffers from extreme temperatures. This may happen during delivery of the scanner to a hospital in winter, when there may be temperatures below −20° C.

Moreover, white separators or spacers made by means of this known technology must be fairly thick. The efficiency of a white reflecting layer at wavelength λ is defined by the scattering coefficient $S_\lambda$ of Kubelka and Munk, which is related to the layer thickness d and the diffuse reflectance $R_\lambda$, as defined by their well-known formula $$s_\lambda = \frac{R_\lambda}{1 - R_\lambda d}$$

Typically, scattering coefficients not much larger than 2000 cm$^{-1}$ can be achieved by using epoxy resins whose refractive index generally exceeds 1.5. This means that a separator having a thickness of 100 μm will transmit 5% of the light as crosstalk. This is particularly important when it is desired to reduce dixel size to improve the spatial resolution of the CT image.

Furthermore, white coatings at the outside edge of an array, where space for coatings is limited, must also be relatively thick. A coating having a thickness of 50 μm will lose 9% of the light incident upon it.

Accordingly, the invention preferably seeks to mitigate, alleviate or eliminate one or more of the above-mentioned disadvantages singly or in any combination.

OBJECT AND SUMMARY OF THE INVENTION

It is an object of the present invention to provide an alternative to the prior art. In particular, it is an object of the present invention to provide a radiation detector that solves the above-mentioned problems of the prior art with regard to the mechanical properties, crosstalk between pixels and/or the need for a relatively thick layer of light-reflecting material or separator.

The object described above and several other objects are thus intended to be obtained in a first aspect of the invention by providing a radiation detector comprising:

a photo-detecting element array having one or more photo-detecting elements;

one or more imaging elements adjacent to the photo-detecting element array;

light-reflecting material covering the side faces as well as the top side or sides of the one or more imaging elements, wherein at least a part of the light-reflecting material comprises a tough, pliable resin.

The pliability of the resin provides good mechanical properties, and will allow the resin to change its size with temperature in conformity with the changes in the silicon chip without exerting substantial forces upon that chip. Differential thermal expansion of the detector components is thus allowed without generating large delamination forces.

Moreover, the pliability will also allow assembly of the array upon the photo-detecting element array even when either of them is not absolutely flat, because they can be pressed together to conform.

The photo-detecting element array is advantageously a semiconductor array such as a silicon photodiode. It should be noted that typically the imaging element or elements is or are arranged on and fixed to the respective photo-detecting elements on the photo-detecting element array. "Side faces" and "top side" are understood to denote the parts of the imaging elements when used to detect radiation such as X-rays incident from above. The side faces and top side together form the peripheral faces of the imaging elements except for the parts of the imaging elements facing the photo-detecting elements. The terms "side faces" and "top side" have their normal meaning when the radiation detector is seen from the side in a position with the photo-detecting element underneath, i.e. the top side of an imaging element is the side facing upwardly towards the incident radiation, e.g. X-rays, and the side faces of an imaging element are the faces facing the sides, viz. typically the vertical sides.

"Pliable resin" is understood to denote a resin which is easily bent by relatively small forces, unlike materials, e.g. epoxy resin, which might crack in these conditions. The resin of the invention is also a tough resin in the sense that quite a lot of energy is required to break the resin, i.e. the resin has a relatively high toughness.

Typically, the radiation detector is an X-ray detector.

According to an aspect of the invention, the tough, pliable resin has a modulus of elasticity of less than 2 GPa and preferably less than 1 GPa. Moreover, the tough, pliable resin has a toughness of more than 0.6 J/m$^3$. A tough, pliable resin having these mechanical properties is advantageous in that it allows differential thermal expansion of the detector components without generating large delamination forces.

According to an aspect of the invention, the tough, pliable resin has a low refractive index. The low refractive index of the resin provides an increase of the scattering coefficient (the "whiteness") and thus the reflectance of the light-reflecting material as compared to known epoxy resins. Thereby it becomes possible to obtain a light-reflecting material having a scattering coefficient exceeding 4000 cm$^{-1}$, which is twice the scattering coefficient of similar epoxy resins. This provides a corresponding reduction of optical crosstalk between dixels of the array for a given separator thickness, or a given level of optical crosstalk can be achieved with only half the separator thickness. For a given level of crosstalk, the separator thickness may thus be reduced; this reduction will be advantageous for patients during radiation, because thinner separators reduce patient radiation dose, such as patient X-ray dose.

The use of a high-reflectance resin as light-reflecting material and the resulting possible reduction of thickness of the reflecting material is particularly important around the edges of tile arrays which must be butted together as closely as possible. The tolerance on the outside dimensions of each tile must be controlled very carefully, and reduction of the thickness of the outer layer of light-reflecting material, even by a few tens of microns, may be important in that it may facilitate less expensive manufacturing technology and thus allows less expensive medical examinations.

According to a further aspect of the invention, the light-reflecting element has a low refractive index of less than 1.5, and preferably less than 1.45. Such low values of the refractive index ensure that the problems of the prior art as described above are mitigated, or even overcome, in that it becomes possible to obtain a light-reflecting material having a scattering coefficient exceeding 4000 cm$^{-1}$, which is twice the scattering coefficient of similar epoxy resins. A resin having a refractive index of 1.44 has turned out to be advantageous.

According to another aspect of the invention, said part of the light-reflecting material, which comprises a pliable resin having a low refractive index, comprises a silicon resin or a thermoplastic fluoropolymer. Examples of a suitable silicon resin may be Nu-Sil LS-6143 and Elastosil RT601, whilst an example of a suitable thermoplastic fluoropolymer may be PVDF. These examples of materials have a refractive index of less than 1.45, viz. 1.43 or 1.42, and have turned out to be suitable as light-reflecting materials in radiation detectors because of their toughness, pliability and low refractive index.

According to another aspect of the invention, the light-reflecting material also comprises particles of a filler material dispersed in the silicon resin or thermoplastic fluoropolymer. The particles of filler material preferably comprise particles of $TiO_2$. "Filler material" is understood to denote material which, when added to a material, increases its scattering coefficient.

According to yet another aspect of the invention, the particles of filler material have a mean particle size of approximately 0.5 μm. This provides an appropriate increase of the scattering coefficient of the resultant material due to the fact that the scattering of the light from the transparent $TiO_2$ particles takes place at the interface between the particles and the resin in which they are dispersed. The more $TiO_2$ particles in the resin, and the larger the angle of refraction of the light through their interfaces with the resin, the larger the scattering becomes.

According to a further aspect of the invention, said part of the light-reflecting material comprises the light-reflecting material covering the top side or sides of the one or more imaging elements. Most of the improvement with regard to withstanding environmental stresses is achieved when the top side or sides is or are made of the pliable resin only, because its elasticity will reduce stresses. Thermal contraction forces on the top sides are much larger than thermal contraction forces of the light-reflecting material in between imaging elements, because of the substantially larger area of the top side or sides of the light-reflecting material as compared to the light-reflecting material on the side faces of the imaging elements and in the separators in between adjacent imaging elements.

In yet another aspect, said part of the light-reflecting material also comprises the light-reflecting material covering the side faces of the one or more imaging elements. If substantially all the light-reflecting material is made of the pliable resin with a low refractive index, it is thus possible to benefit most from the advantages of using this material.

The invention also relates to a radiation detector comprising a photo-detecting element array having one or more photo-detecting elements; one or more imaging elements adjacent to the photo-detecting element array; light-reflecting material covering the side faces as well as the top side or sides of the one or more imaging elements, wherein at least a part of the light-reflecting material comprises a resin having a low refractive index.

The low refractive index of the resin provides an increase of the scattering coefficient (the "whiteness") and thus the reflectance of the light-reflecting material compared to known epoxy resins. Thereby it becomes possible to obtain a light-reflecting material having a scattering coefficient exceeding 4000 cm$^{-1}$, which is twice the scattering coefficient of similar epoxy resins. This provides a corresponding reduction of optical crosstalk between dixels of the array for a given separator thickness, or a given level of optical crosstalk can be achieved with only half the separator thickness. For a given level of crosstalk, the separator thickness may thus be reduced; this reduction will be advantageous for patients during radiation, because thinner separators reduce patient X-ray dose.

The use of a high-reflectance resin as light-reflecting material and the resulting possible reduction of thickness of the reflecting material is particularly important around the edges of tile arrays which must be butted together as closely as possible. The tolerance on the outside dimensions of each tile must be controlled very carefully, and reduction of the thickness of the outer layer of light-reflecting material, even by a few tens of microns, may be important in that it may facilitate less expensive manufacturing technology and thus allows less expensive medical examinations.

According to an aspect of the invention, the light-reflecting element has a low refractive index of less than 1.5, and preferably less than 1.45. Such low values of the refractive index ensure that the problems of the prior art as described above are overcome in that it becomes possible to obtain a light-reflecting material having a scattering coefficient exceeding 4000 cm$^{-1}$, which is twice the scattering coefficient of similar epoxy resins. A resin having a refractive index of 1.44 has turned out to be advantageous.

Finally, the invention relates to a CT scanner comprising a radiation detector according to the invention.

It should be noted that the terms "separator" and "spacer" are used synonymously throughout this specification. In other documents, the term "partition" may be used in the same meaning. The separators or spacers typically comprise or are made of light-reflecting material.

The different aspects of the present invention may each be combined with any of the other aspects. These and other aspects of the invention are apparent from and will be elucidated with reference to the embodiments described hereinafter.

BRIEF DESCRIPTION OF THE DRAWINGS

The radiation detector and the light-reflecting material for a radiation detector according to the invention will now be described in more detail with reference to the accompanying Figures. The Figures show one way of implementing the present invention and are not to be construed as limiting other possible embodiments falling within the scope of the appended claims.

FIG. 2b is a sectional view of the radiation detector taken on the line 2B-2B in FIG. 2a;

FIG. 3b is a sectional view of the radiation detector taken on the line 3B-3B in FIG. 3a.

DESCRIPTION OF EMBODIMENTS

Figure 1:
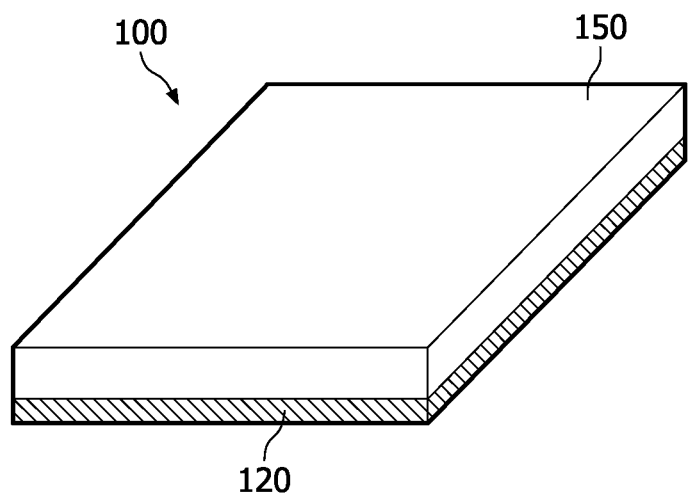
FIG. 1 is a perspective view of a radiation detector.

FIG. 1 is a perspective view of a radiation detector 100. The radiation detector 100 is an X-ray detector. The X-ray detector 100 comprises a photo-detecting element array 120 having one or more photo-detecting elements. The photo-detecting elements may be photodiodes or any other material converting light to electricity. The detector 100 also comprises imaging elements in the form of a scintillation layer 150 comprising one or more scintillator elements. The scintillator elements of the scintillation layer 150 are covered by a light-reflecting material. FIG. 1 shows that the scintillation layer 150 is arranged above and fixed to the photo-detecting element array 120. The scintillation layer may be optically coupled to the front or top surface of the photo detector array using an optical adhesive. In FIG. 1, the components of the scintillation layer, viz. the scintillator elements, are covered and concealed by the light-reflecting material.

Figure 2A:
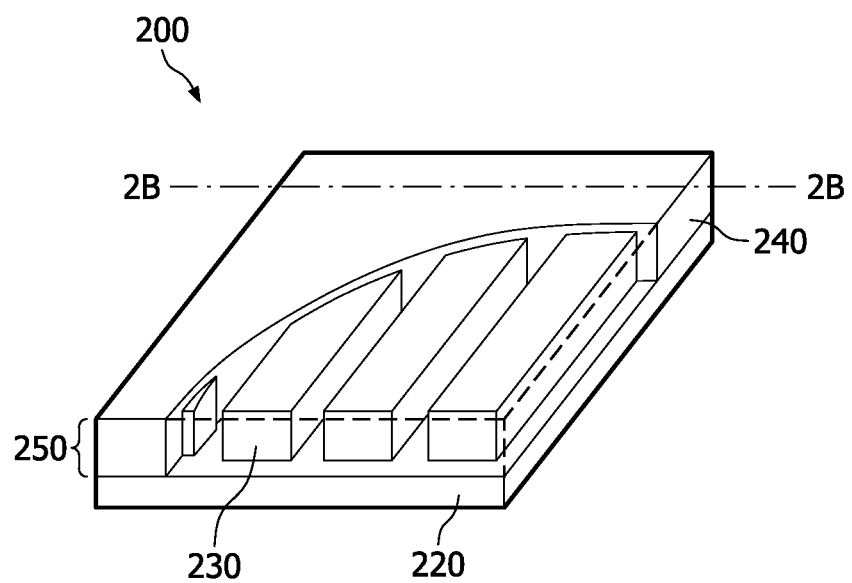
FIG. 2a is a perspective view of a radiation detector with a part of the light-reflecting material cut out for illustration.
Figure 2B:
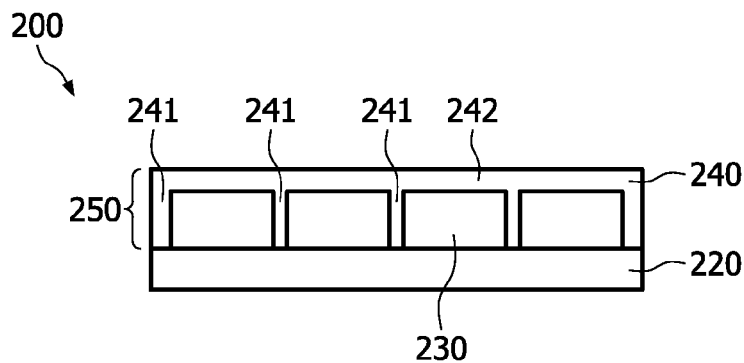

FIG. 2a is a perspective view of a radiation detector 200 with a part of the light-reflecting material cut out for illustration, and FIG. 2b is a sectional view of the radiation detector taken on a vertical plane through the line 2B-2B in FIG. 2a. The radiation detector 200 is an example of the radiation detector 100 of FIG. 1; the radiation detector 200 is an X-ray detector. FIG. 2a shows a photo-detecting element array 220 upon which a scintillation layer 250 is arranged. The scintillation layer 250 comprises light-reflecting material 240 as well as a plurality of scintillators 230, e.g. gadolinium oxysulphide (GOS) scintillators. In the example of FIGS. 2a and 2b, the scintillators 230 are formed as box-shaped rectangular elements. The scintillators 230 may e.g. be 1 mm wide and have a length of up to 20 mm. The light-reflecting material extends around the peripheral faces of the scintillators, viz. their faces not facing the photo-detecting element array 220. The light-reflecting material thus lies between every two adjacent scintillators 230, and on the outer side of the faces of the outside scintillators and on the top sides of all scintillators. The outer surfaces of the scintillation layer are plane, so that the light-reflecting material forms a top cover 242 as well as spacers or separators 241 (see FIG. 2b). FIG. 2b is a cross-section taken on the vertical plane through the line 2B-2B in FIG. 2a. FIG. 2b shows the radiation detector 200 comprising the photo-detecting element array 220 as well as the scintillation layer 250 with the scintillators 230 and the light-reflecting material 240. The top cover 242 is shown as a layer covering the top sides of the scintillators 230. Spacers or separators 241 of light-reflecting material are present between any two adjacent scintillators as well as on the outer side of the uttermost scintillator faces. The light-reflecting material surfaces are arranged to reflect light generated by scintillation when X-rays are absorbed in the scintillator material, downwardly into the sensitive region of the photo-detecting element, to avoid loss upwardly, or scattering sideways into neighbouring dixels. For the purpose of clarity, only four scintillators are shown in FIGS. 2a and 2b; however, it should be noted that typically a larger number of scintillators are arranged on each photo-detecting element array.

The light-reflecting material is a tough, pliable resin having a low refractive index, e.g. a silicon resin or a thermoplastic fluoropolymer, containing particles of titanium oxide ($TiO_2$). The use of a pliable resin may be restricted to the material lying above the top faces (as seen in the orientation of FIGS. 2a and 2b) of the scintillators or to the top cover 242 of the light-reflecting material, in that the thermal contraction forces of the top cover or the material above the top faces of the scintillators are much larger than the thermal contraction forces of the spacers or separators 241 due to the much larger area of the top cover or material covering the top faces of the scintillators as compared to the area of the spacers or separators 241. When the silicon resin or thermoplastic fluoropolymer is used for the top cover or for the material above the top faces of the scintillators only, the remaining part of the resin may be any conventional resin, such as an epoxy resin.

Figure 3A:
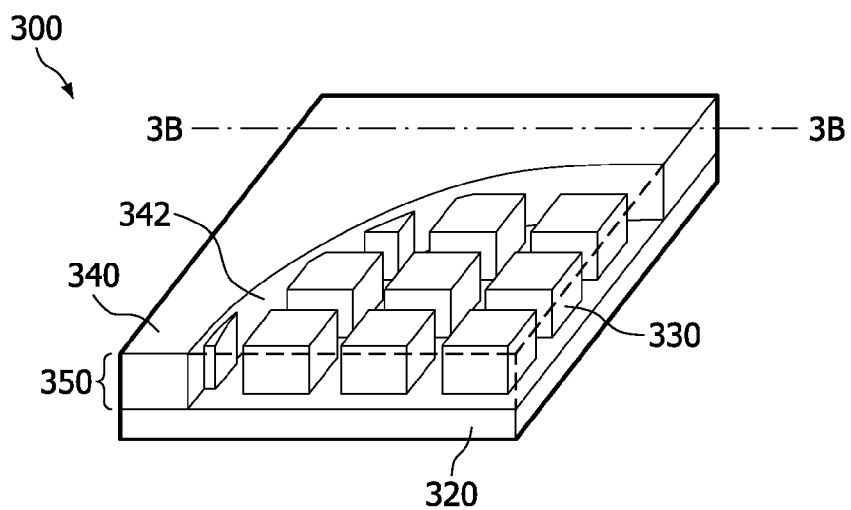
FIG. 3a is a perspective view of an alternative radiation detector with a part of the light-reflecting material cut out for illustration.
Figure 3B:
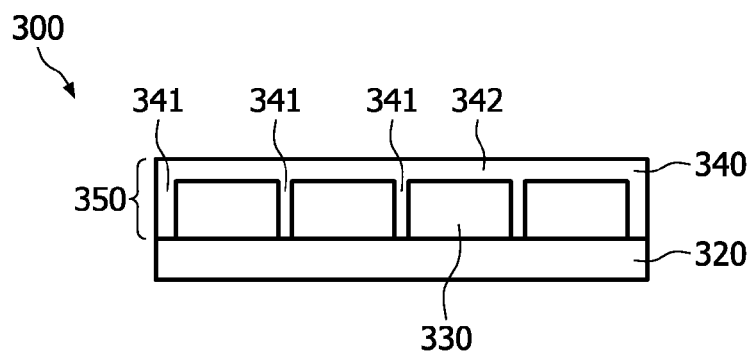

FIG. 3a is a perspective view of an alternative radiation detector 300 with a part of the light-reflecting material cut out for illustration, and FIG. 3b is a sectional view of the radiation detector taken on the vertical plane through the line 3B-3B in FIG. 3a. The radiation detector 300 is another example of the radiation detector 100 of FIG. 1; the radiation detector 300 is also an X-ray detector. Whilst the radiation detector 200 of FIGS. 2a and 2b was of the single-slice CT type, the radiation detector 30 of FIGS. 3a and 3b is of the multi-slice CT type. FIG. 3a shows a photo-detecting element array 320 upon which an imaging layer 350 is arranged in the form of a scintillation layer. The scintillation layer 350 comprises light-reflecting material 340 as well as a plurality of imaging elements in the form of scintillator elements 330, e.g. GOS scintillators. In the example of FIGS. 3a and 3b, the scintillators 330 are formed as box-shaped or cubical elements having planar side faces and top and bottom sides. Such elements are also denoted as "dixels". The scintillator elements 330 may have a width of, for example, about 1 mm and a length of about 0.5 to 1.5 mm, or vice versa. The light-reflecting material extends around the peripheral faces of the scintillators, viz. all of their faces not facing the photo-detecting element array 320. The light-reflecting material is thus present between the side faces of any two adjacent scintillators 330, and on the outer side of the uttermost scintillator faces and on the top side of the scintillators. The outer surfaces of the scintillation layer are plane, so that the light-reflecting material forms a top cover 342 as well as spacers or separators 341 (see FIG. 3b). FIG. 3b is a cross-section taken on the line 3b-3b in FIG. 3a. FIG. 3b shows the radiation detector 300 comprising the photo-detecting element array 320 as well as the scintillation layer 350 with the scintillators 330 and the light-reflecting material 340. The top cover 342 is shown as a layer covering the top sides of the scintillators 330. Spacers or separators 341 of light-reflecting material are present between any two adjacent scintillators as well as on the outer side of the uttermost scintillator faces. For the purpose of clarity, only four scintillators are shown in FIGS. 3a and 3b; however, it should be noted that typically a larger number of scintillators are arranged on each photo-detecting element array.

The light-reflecting material is a tough, pliable resin having a low refractive index, e.g. a silicon resin or a thermoplastic fluoropolymer, containing particles of titanium oxide ($TiO_2$). The use of a pliable resin with or without a low refractive index may be restricted to the material above the top faces (as seen in the orientation of FIGS. 3a and 3b) of the scintillators or to the top cover 342 of the light-reflecting material, in that the thermal contraction forces of the top cover or the material above the top faces of the scintillators are much larger than the thermal contraction forces of the spacers or separators 341 due to the much larger area of the top cover or material covering the top faces of the scintillators as compared to the area of the spacers or separators 341. When the silicon resin or thermoplastic fluoropolymer is used for the top cover or for the material above the top faces of the scintillators, the remaining part of the resin may be any conventional resin, such as an epoxy resin.

If a pliable resin is used for the top faces of the scintillators, it has preferably but not necessarily a low refractive index, because the restriction of material thickness is less severe on the top face.

Figure 4:
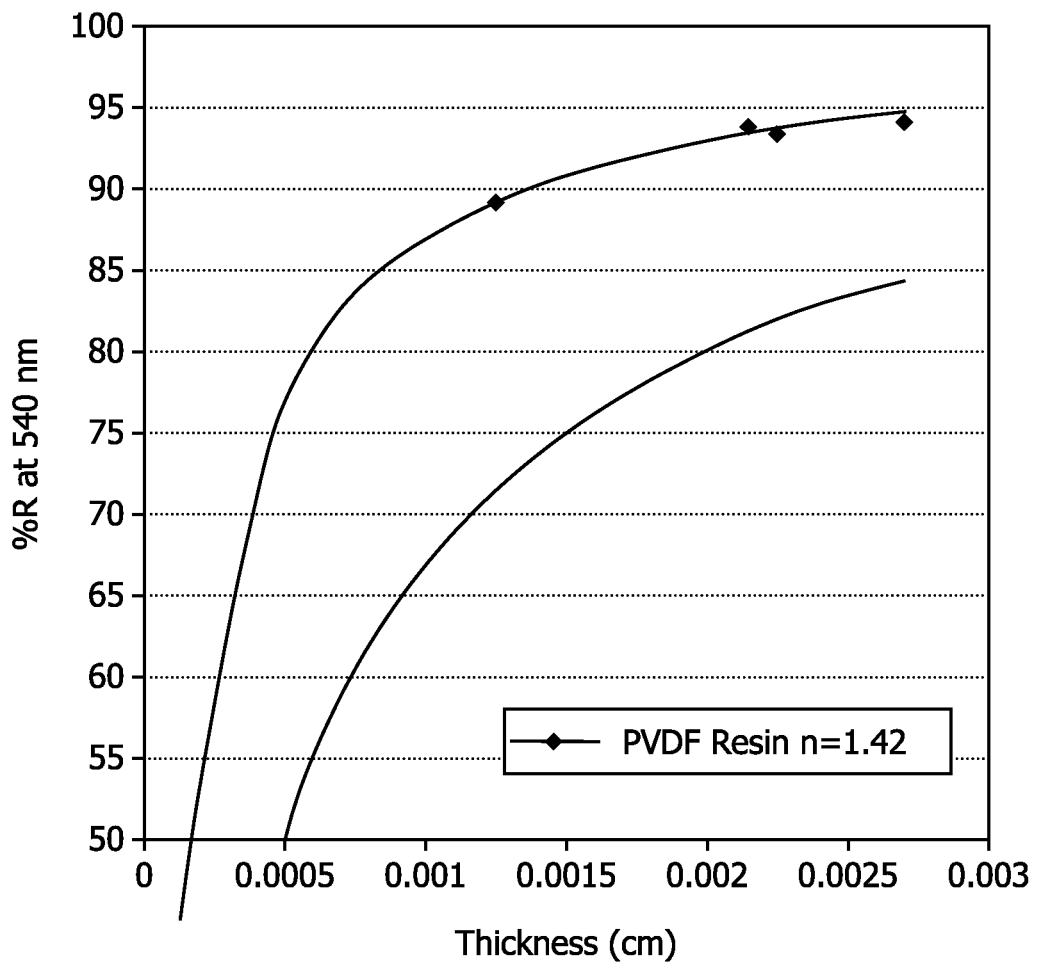
FIG. 4 shows graphs of the diffuse reflectance of a low-index resin and of an epoxy resin as functions of the thickness of the resins.

FIG. 4 shows graphs of the diffuse reflectance of a low refractive index resin and of an epoxy resin as functions of the thickness of the resins. The lower curve in FIG. 4 shows the diffuse reflectance of light having a wavelength of 540 nm of coatings made by using titanium dioxide filler finely dispersed in an epoxy resin. The epoxy resin has a nominal refractive index of 1.538 and a scattering coefficient $S_\lambda$ of 2000 $cm^{-1}$ at a wavelength $\lambda$ of 540 nm. In comparison, the upper curve in FIG. 4 shows a similar coating made of PVDF resin which has a refractive index of 1.42. This PVDF resin has a scattering coefficient $S_\lambda$ of 6660 $cm^{-1}$ at a wavelength $\lambda$ of 540 nm.

Each coating is made by dispersing fine powder (mean particle size about 0.5 µm) in a first part (part A) of the resin to a concentration of 70% wt/wt and de-aerating before mixing in another de-aerated part (Part B) of the resin without mixed-in powder. The powder may be titanium oxide ($TiO_2$). The graphs of FIG. 4 show the dependence of reflectance upon coating thickness and are in good conformity with the Kubelka-Munk formula given above. FIG. 4 shows that the PVDF resin having a low refractive index provides a higher reflectance for any thickness of the resin as compared to the epoxy resin. Use of a resin having a low refractive index thus improves the reflectance as compared to epoxy resins having a refractive index of about 1.58. Optical crosstalk between dixels of a scintillator array may thereby be reduced for a given coating thickness, or a given level of crosstalk may be achieved with a reduced separator thickness.

The white resin may be applied between the dixels of a diced scintillator blank, preferably in vacuum to avoid air bubbles, within 30 minutes or so after preparation. It is preferable to do this when the work piece is hot, say 45° C., to reduce the resin viscosity. Afterwards the component may be baked, to cure the resin.

An alternative to a PVDF resin is any silicon resin having a similar refractive index. Examples of resins which can be used for this purpose include Nu-Sil LS-6143 and Elastosil RT601, but any tough, pliable silicon resin having a low refractive index will do.

The $TiO_2$ powder used may be Du Pont Ti-pure R-931, which has a mean particle size of 0.55 µm, which is close to the peak emission wavelength of the GOS scintillator. Individual particles may be coated with $SiO_2$, to prevent optical contact between them at high concentrations, and to permit scattering.

Although the present invention has been described in connection with the specified embodiments, it should not be construed as being in any way limited to the presented examples. The scope of the present invention is set out by the appendant claims. In the context of the claims, use of the verb "comprise" and its conjugations does not exclude other possible elements or steps. Use of the indefinite article "a" or "an" should not be construed as excluding a plurality. Use of reference signs in the claims with respect to elements indicated in the Figures should neither be construed as limiting the scope of the invention. Furthermore, individual features mentioned in different claims may be advantageously combined, and the mentioning of these features in different claims does not exclude that a combination of features may be possible and advantageous.

The invention claimed is:

1. A radiation detector comprising:
   a photo-detecting element array having one or more photo-detecting elements, and optically coupled to one or more of the bottom faces of imaging elements;
   one or more imaging elements adjacent to the photo-detecting element array, wherein each imaging element comprises a scintillation crystal having multiple planar side faces, a top face, and a bottom face; and
   a light-reflecting material covering the side faces of the imaging elements, as well as a top surface of the one or more photo-detecting elements exposed between the imaging elements, wherein the light-reflecting material comprises only a single resin having a refractive index which is less than 1.45;
   wherein the resin has a modulus of elasticity of less than 2 GPa.

2. A radiation detector according to claim 1, wherein the resin has a toughness of more than 0.6 $J/m^3$.

3. A radiation detector according to claim 1, wherein said resin comprises a silicon resin or a thermoplastic fluoropolymer.

4. A radiation detector according to claim 3, wherein said light-reflecting material also comprises particles of a filler material dispersed in the silicon resin or thermoplastic fluoropolymer.

5. A radiation detector according to claim 4, wherein the particles of filler material comprise particles of $TiO_2$.

6. A radiation detector according to claim 4, wherein the particles of filler material have a mean particle size of approximately 0.5 µm.

7. A radiation detector according to claim 1, wherein the light-reflecting material additionally covers the top faces of the one or more imaging elements.

8. A radiation detector according to claim 1, wherein the top faces of the imaging elements are covered by a material which is different from the light-reflecting material.

9. A radiation detector according to claim 1, wherein the scintillation crystal comprises gadolinium oxysulphide (GOS).

10. A CT scanner comprising a radiation detector, wherein the radiation detector comprises:
    a photo-detecting element array having one or more photo-detecting elements, and optically coupled to one or more of the bottom faces of imaging elements;
    one or more imaging elements adjacent to the photo-detecting element array, wherein each imaging element comprises a scintillation crystal having multiple planar side faces, a top face, and a bottom face; and
    a light-reflecting material covering the side faces of the imaging elements, as well as a top surface of the one or more photo-detecting elements exposed between the imaging elements, wherein the light-reflecting material comprises only a single resin having a refractive index which is less than 1.45;
    wherein the resin has a modulus of elasticity of less than 2 GPa.

11. A CT scanner according to claim 10, wherein the resin has a modulus of elasticity of less than 1 GPa.

12. A CT scanner according to claim 10, wherein the resin has a toughness of more than 0.6 $J/m^3$.

13. A CT scanner according to claim 10, wherein said resin comprises a silicon resin or a thermoplastic fluoropolymer.

14. A CT scanner according to claim 13, wherein said light-reflecting material also comprises particles of a filler material dispersed in the silicon resin or thermoplastic fluoropolymer.

15. A CT scanner according to claim 14, wherein the particles of filler material comprise particles of $TiO_2$.

16. A CT scanner according to claim 14, wherein the particles of filler material have a mean particle size of approximately 0.5 µm.

17. A radiation detector according to claim 10, wherein the top faces of the imaging elements are covered by a material which is different from the light-reflecting material.

18. A radiation detector comprising:
    a photo-detecting element array having one or more photo-detecting elements, and optically coupled to one or more of the bottom faces of imaging elements;
    one or more imaging elements adjacent to the photo-detecting element array, wherein each imaging element comprises a scintillation crystal having multiple planar side faces, a top face, and a bottom face; and
    a light-reflecting material covering the side faces of the imaging elements, as well as a top surface of the one or more photo-detecting elements exposed between the imaging elements, wherein the light-reflecting material comprises only a single resin having a refractive index which is less than 1.45;
    wherein the resin has a toughness of more than 0.6 $J/m^3$.

19. A radiation detector according to claim 18, wherein the resin has a modulus of elasticity of less than 2 GPa.

20. A radiation detector according to claim 18, wherein said resin comprises a silicon resin or a thermoplastic fluoropolymer.

21. A radiation detector according to claim 20, wherein said light-reflecting material also comprises particles of a filler material dispersed in the silicon resin or thermoplastic fluoropolymer.

22. A radiation detector according to claim 21, wherein the particles of filler material comprise particles of $TiO_2$.

23. A radiation detector according to claim 21, wherein the particles of filler material have a mean particle size of approximately 0.5 µm.

24. A radiation detector according to claim 18, wherein the light-reflecting material additionally covers the top faces of the one or more imaging elements.

25. A radiation detector according to claim 18, wherein the top faces of the imaging elements are covered by a material which is different from the light-reflecting material.

26. A radiation detector according to claim 18, wherein the scintillation crystal comprises gadolinium oxysulphide (GOS).

* * * * *